United States Patent [19]

Tanaka et al.

[11] Patent Number: 5,766,777
[45] Date of Patent: Jun. 16, 1998

[54] COMPOSITE COPPER ALLOY BEARING

[75] Inventors: Tadashi Tanaka; Koichi Yamamoto; Yoshiaki Sato, all of Nagoya, Japan

[73] Assignee: Daido Metal Company Ltd., Nagoya, Japan

[21] Appl. No.: 608,500

[22] Filed: Feb. 28, 1996

[30] Foreign Application Priority Data

Apr. 5, 1995 [JP] Japan .................................. 7-107005

[51] Int. Cl.$^6$ ...................................................... F16C 33/12
[52] U.S. Cl. .......................... 428/647; 428/648; 428/650; 428/652; 428/654; 428/674; 428/675; 428/680; 384/912
[58] Field of Search .......................... 428/647, 648, 428/650, 652, 653, 654, 675, 677, 674, 680; 384/912

[56] References Cited

U.S. PATENT DOCUMENTS

| | | | |
|---|---|---|---|
| 4,188,079 | 2/1980 | Mori | 308/237 R |
| 4,189,525 | 2/1980 | Mori | 428/643 |
| 4,696,867 | 9/1987 | Eastwood | 428/650 |
| 5,162,100 | 11/1992 | Tanaka et al. | 420/530 |
| 5,362,574 | 11/1994 | Tanaka et al. | 428/643 |
| 5,432,013 | 7/1995 | Tanaka et al. | 428/643 |
| 5,434,012 | 7/1995 | Tanaka et al. | 428/643 |
| 5,445,896 | 8/1995 | Tanaka et al. | 428/647 |
| 5,470,666 | 11/1995 | Tanaka et al. | 428/653 |
| 5,525,294 | 6/1996 | Tanaka et al. | 420/530 |

FOREIGN PATENT DOCUMENTS

| | | |
|---|---|---|
| 2233718 | 1/1991 | Japan. |
| 2270927 | 3/1994 | United Kingdom. |

*Primary Examiner*—Paul J. Thibodeau
*Assistant Examiner*—Holly C. Rickman
*Attorney, Agent, or Firm*—Browdy and Neimark

[57] ABSTRACT

A composite copper alloy bearing is provided with a backing metal layer, an intermediate layer of Cu—Pb alloy, and a surface layer of Al—Sn alloy. A thickness of the surface layer is not less than either larger value selected between 0.06 mm and a value 0.2 times the sum of thicknesses of the intermediate layer and the surface layer but not more than a value 0.5 times the sum of the thicknesses of the intermediate layer and the surface layer. With this construction, the surface layer exhibits excellent sliding properties while the intermediate layer maintains high conformability, and therefore there can be provided the composite copper alloy bearing which has high fatigue strength particularly even in a case where a shaft susceptible to misalignment is used.

15 Claims, No Drawings

COMPOSITE COPPER ALLOY BEARING

BACKGROUND OF THE INVENTION

This invention relates to a composite copper alloy bearing.

An Al—Sn alloy excellent in load capacity and fatigue resistance has been used in a composite bearing used under a high-load condition, such for example as a composite bearing used in an internal combustion engine, since such a bearing is used under a high load. Recently, with a high-speed, high-load design of internal combustion engines, there has been a demand for a bearing that can be used under more severe conditions.

Generally, an Al—Sn bearing alloy is excellent or superior in various bearing properties such as seizure resistance and corrosion resistance, and in many cases bearings used under high load have two layers, that is a backing metal layer and a bearing alloy layer. If the hardness of the bearing alloy is increased in order to enhance the load resistance, conformability and foreign matter embeddability are lowered, and the seizure resistance is lowered.

On the other hand, a composite Cu—Pb alloy bearing is high in strength, and excellent in fatigue resistance, but is inferior in seizure resistance, foreign matter embeddability and conformability. Therefore, a soft Pb alloy overlay (surface layer) is formed on the bearing so as to improve sliding properties. However, with a high-speed, high-load design of internal combustion engines, a further improvement of the fatigue resistance by the Pb-alloy surface layer is limited since the Pb alloy surface layer is soft, and is low in thermal conductivity, and has a low melting point.

One known technique of a composite Cu alloy bearing for meeting the above condition of use is disclosed in JP-A-6-93423. In this conventional technique, a surface layer is made of Al—Sn alloy consisting of 4~50 wt. % Pb, Sn of 2~20 wt. % calculated in terms of the Pb content, and the balance Al, and the surface layer is formed to provide a thickness of 0.002~0.03 mm by a PVD method.

JP-U-59-169430 discloses a technique for a composite Cu alloy bearing in which a surface layer of Al—Sn alloy is formed on an intermediate layer of Cu alloy in order to prevent wear from being caused by a scavenger contained in leaded fuel used in an internal combustion engine. In this conventional technique also, the surface layer is formed into a thin layer with a thickness of 5~10 μm (0.005~0.01 mm) by a plating method. With this thin layer, high foreign matter embeddability can be obtained.

However, in a case where a shaft formed into a more compact design was subjected to high-speed rotation and a high load, fatigue cracks are often apt to occur in both edge portions of the bearing surface, and it has been found that even the composite bearings of the above conventional techniques are insufficient in fatigue strength. It is thought that this phenomenon is due to the fact that the shaft, when subjected to a large load, is bent to cause misalignment, so that concentrated stresses acting on the edge portions of the bearing surface exceed the maximum limit of fatigue strength. Particularly in the above conventional techniques, the surface layer is as thin as not more than 0.03 mm, and therefore sufficient conformability is not achieved, which is thought to be the reason why the fatigue resistance can not be increased to a satisfactory level. On the other hand, if the surface layer is made of a soft alloy in order to enhance the conformability, the load capacity, the fatigue resistance and so on can not be increased.

SUMMARY OF THE INVENTION

With the above problems in view, it is an object of this invention to provide a bearing in which both of conformability and fatigue strength are improved so that the bearing can meet with a high-speed, high-load design of an internal combustion engine.

According to the present invention, there is provided a composite copper alloy bearing comprising a backing metal layer, an intermediate layer of Cu—Pb alloy, and a surface layer of Al—Sn alloy, the surface layer having a thickness of not less than either larger value selected between 0.06 mm and a value 0.2 times the sum of thicknesses of the intermediate layer and the surface layer but not more than a value 0.5 times the sum of the thicknesses of the intermediate layer and the surface layer.

Preferably, the intermediate layer and the surface layer are bonded together by a pressure bonding method for more convenient production, although a plating method can also be used less easily and with less reproducibility.

Preferably, the intermediate layer consists essentially of 9~32 wt. % Pb, at least one kind selected from the group consisting of not more than 12 wt. % Sn and not more than 0.5 wt. % P, and the balance Cu and incidental impurities.

Preferably, the surface layer consists essentially of 3~40 wt. % Sn, 0.5~15 wt. % Pb, 0.1~3 wt. % Si, 0.2~5 wt. % Cu, at least one optional element not more than 3 wt. % in total selected from the group consisting of Ni, Mn, V, Mg and Sb, and the balance Al and incidental impurities.

Preferably, a dam layer consisting of Ni or Al may be formed between the intermediate layer and the surface layer.

In order to achieve the required strength of the composite bearing, the backing metal layer is preferably formed of a steel sheet of high rigidity, and particularly is made of a cold rolled low-carbon steel sheet. Alternatively, the backing metal layer of Cu alloy may be used.

The intermediate layer is made of Cu—Pb alloy. This intermediate layer serves to enhance load capacity and fatigue strength.

Pb, which is one component of the Cu—Pb alloy, improves foreign matter embeddability. This effect is high particularly when the intermediate layer contains 9~32 wt. % Pb. If this content is more than 32 wt. %, the strength is lowered. When the surface layer is locally worn, so that the intermediate layer is exposed to the surface, and the function of seizure resistance is maintained by Pb. If the Pb content is less than 9 wt. %, the improvement of the foreign matter embeddability can not be expected.

The addition of Sn in the Cu—Pb alloy enhances the strength of the intermediate layer, and also improves corrosion resistance. However, if this content is more than 12 wt. %, the thermal conductivity thereof is lowered.

The addition of P in the Cu—Pb alloy increases the strength of the intermediate layer. However, if this content is more than 0.5 wt. %, the toughness thereof is lowered.

The surface layer is made of Al—Sn alloy. This surface layer serves to enhance sliding properties and conformability.

When Sn is added as a component of the alloy, surface properties such as seizure resistance, conformability and foreign matter embeddability are improved. If this content is less than 3 wt. %, a satisfactory effect can not be obtained, and if this content is more than 40 wt. %, the mechanical properties thereof are lowered.

The addition of Pb to the surface layer improves the seizure resistance, and also improves a cutting ability (workability) required during the process of finishing an inner surface in the manufacture of the bearing. If this content is less than 0.5 wt. %, a satisfactory effect is not obtained, and if this content is more than 15 wt. %, this substance is liable to segregate, so that Pb can not be easily dispersed uniformly in the Al matrix.

3

When Si is added to the surface layer, it is in a solid-solution state in the Al matrix to harden the surface layer, thereby improving wear resistance. Also, by crystallizing hard Si particles, the wear resistance is improved. If this content is less than 0.1 wt. %, a satisfactory effect can not be obtained, and if this content is more than 3 wt. %, the surface layer becomes brittle.

Cu in the surface layer is in a solid-solution state in the Al matrix, and is particularly effective in enhancing the fatigue strength. If this content is less than 0.2 wt. %, a satisfactory effect can not be obtained, and if this content is more than 5 wt. %, the conformability is lowered, and besides plastic working during the production process becomes difficult.

When at least one of Ni, Mn, V, Mg and Sb is added, it is in a solid-solution state in the Al matrix, or precipitates as an intermetallic compound, thereby strengthening the surface layer. If this content is more than 3 wt. %, the coarse compound is formed, thereby embrittling the surface layer, and therefore this content should be not more than 3 wt. %.

The thickness of the surface layer is not less than 0.06 mm. If the surface layer is as thin as less than 0.06 mm, satisfactory conformability is not achieved, and the enhanced fatigue strength can not be expected, either. And beside, the surface layer is subjected to premature wear, so that the intermediate layer is exposed. In a large-size bearing, the sum of the thicknesses of the intermediate layer and the surface layer is large, and in order to achieve satisfactory conformability, it is necessary that the thickness of the surface layer should be not less than 0.2 times the sum of the thicknesses of the intermediate layer and the surface layer. Therefore, the thickness of the surface layer is limited to be not less than either larger value selected between 0.06 mm and a value 0.2 times the sum of thicknesses of the intermediate layer and the surface layer.

On the other hand, if the surface layer becomes thick, the amount of deflection (flexure) of the surface due to repeated loads increases, so that the fatigue strength thereof tends to be rather lowered. Therefore, the thickness of the surface layer is limited to be not more than 0.5 times the sum of the thicknesses of the intermediate layer and the surface layer.

Preferably, the surface layer and the intermediate layer are bonded together by a pressure bonding method. An Al—Sn alloy material for forming the surface layer is produced by casting or sintering, and then is rolled into a sheet having a predetermined thickness. Thereafter, this sheet material is pressure-bonded to the intermediate layer, and then is completely bonded thereto by diffusion annealing. With this pressure bonding method, the surface layer (formed by the sheet material) having a thickness of not less than 0.06 mm can be easily provided.

Although the surface layer can be formed on the intermediate layer by a plating method, a layer formed by plating is apt to have rough surface when its thickness is not less than 0.06 mm, and besides the time required for the plating is long, and this is disadvantageous from the viewpoint of costs. In a casting method, a Cu alloy of the intermediate layer and an Al alloy of the surface layer are bonded together, and in this case a brittle intermetallic compound is liable to be formed. Therefore, when the casting method is used, particular care must be taken.

In a case where the undesirable diffusion of a specific alloy component or where the undesirable formation of an intermetallic compound occurs between the intermediate layer and the surface layer during the diffusion annealing, a dam layer consisting of Ni or Al may be formed between the intermediate layer and the surface layer. By doing so, the formation of a brittle intermetallic compound is prevented, and besides the large bonding force is obtained. The dam layer may consist of Ni—Cu alloy, Ni—Cr alloy, Al—Si alloy, Al—Mn alloy or Al—Cu alloy instead of Ni or Al.

4

As described above, in the present invention of claim 1, there is provided the composite copper alloy bearing consisting of the backing metal layer, the intermediate layer of Cu—Pb alloy, and the surface layer of Al—Sn alloy. The thickness of the surface layer is not less than either larger value selected between 0.06 mm and a value 0.2 times the sum of thicknesses of the intermediate layer and the surface layer but not more than a value 0.5 times the sum of the thicknesses of the intermediate layer and the surface layer. With this construction, there can be provided the composite copper alloy bearing which is excellent in fatigue strength.

Particularly, in a case where the intermediate layer and the surface layer are bonded together by the pressure bonding method, the above composite copper alloy bearing can be readily produced.

Further, in a case where the intermediate layer consists essentially of 9–32 wt. % Pb, at least one kind selected from the group consisting of not more than 12 wt. % Sn and not more than 0.5 wt. % P, and the balance Cu and incidental impurities, the fatigue strength of the bearing can be further enhanced, and various properties necessary for the composite bearing, such as foreign matter embeddability and wear resistance, are improved.

In addition, in a case where the surface layer consists essentially of 3–40 wt. % Sn, 0.5–15 wt. % Pb, 0.1–3 wt. % Si, 0.2–5 wt. % Cu, at least one optional element not more than 3 wt. % in total selected from the group consisting of Ni, Mn, V, Mg and Sb, and the balance Al and incidental impurities, the fatigue strength is further enhanced, and various properties necessary for the composite bearing, such as wear resistance and seizure resistance, are improved.

By providing a dam layer consisting of Ni or Al etc. between the intermediate layer and the surface layer, the intermediate layer and the surface layer are firmly bonded together.

DESCRIPTION OF THE INVENTION

The present invention will now be described by way of Examples and Comparative Examples. Test samples of Examples 1 to 15 and test samples of Comparative Examples 16 to 25 were prepared as follows:

A thin, cold rolled low-carbon steel sheet, containing 0.03–0.23 wt. % carbon, was used as a backing metal layer. Each of metal powder materials for forming an intermediate layer having respective compositions of the test samples was deposited on this thin sheet, and the sintering and rolling thereof were effected repeatedly.

Each of sheet materials for a surface layer having respective compositions of the test samples was formed by alloy casting, ingot rolling, or rolling of sintered metal powder.

Then, each of the sheet materials was placed or superposed on the corresponding intermediate layer, and the two were pressure-bonded together by rolling and then by diffusion annealing. In some of the Examples and Comparative Examples, a dam layer of Ni or Al was formed by electroplating or rolling (pressure-bonding). In Comparative Example 16, the surface layer was bonded directly to the backing metal layer, and no intermediate layer was provided. In Comparative Example 19, the surface layer of Pb—Sn alloy was formed by plating on the surface of the intermediate layer.

Then, each of these intermediate products was cut into strips, and then these strips were curved into a semi-cylindrical shape having a diameter of 56 mm and a width of 26 mm, thereby forming a so-called half-split composite bearing. The thickness of the intermediate layer of each composite bearing is represented by $T_1$ (mm), and the thickness of the surface layer is represented by $T_2$ (mm). Table 1 shows the compositions of the intermediate layers, and Table 2 shows the compositions of the surface layers, and the thicknesses of the intermediate layers as well as the thicknesses of the surfaces layers are shown in Table 3.

TABLE 1

| Sample No. | Composition of Intermediate Layer (wt. %) | | | |
|---|---|---|---|---|
| | Cu | Pb | Sn | P |
| Examples of the Invention | | | | |
| 1 | Balance | 9 | 12 | |
| 2 | Balance | 9 | 12 | |
| 3 | Balance | 10 | 10 | 0.5 |
| 4 | Balance | 17 | 3.5 | |
| 5 | Balance | 23 | 1.5 | 0.01 |
| 6 | Balance | 23 | 1.5 | 0.01 |
| 7 | Balance | 23 | 3.5 | |
| 8 | Balance | 23 | 3.5 | |
| 9 | Balance | 25 | | 0.1 |
| 10 | Balance | 32 | | 0.02 |
| 11 | Balance | 17 | 3.5 | |
| 12 | Balance | 23 | 1.5 | 0.01 |

TABLE 1-continued

| Sample No. | Composition of Intermediate Layer (wt. %) | | | |
|---|---|---|---|---|
| | Cu | Pb | Sn | P |
| 13 | Balance | 23 | 3.5 | |
| 14 | Balance | 25 | | 0.1 |
| 15 | Balance | 32 | | 0.02 |
| Comparative Examples | | | | |
| 16 | — | — | | |
| 17 | Balance | 23 | 3.5 | |
| 18 | Balance | 23 | 3.5 | |
| 19 | Balance | 23 | 3.5 | |
| 20 | Balance | 23 | 1.5 | 0.01 |
| 21 | Balance | 23 | 1.5 | 0.01 |
| 22 | Balance | 23 | 1.5 | 0.01 |
| 23 | Balance | 17 | 3.5 | |
| 24 | Balance | 17 | 3.5 | |
| 25 | Balance | 17 | 3.5 | |

TABLE 2

| Sample No. | Composition of Surface Layer (wt. %) | | | | | | | | | |
|---|---|---|---|---|---|---|---|---|---|---|
| | Al | Sn | Pb | Si | Cu | Ni | Mn | V | Mg | Sb |
| Example of the Invention | | | | | | | | | | |
| 1 | Balance | 40 | 0.5 | 0.1 | 0.8 | | | | | |
| 2 | Balance | 3 | 15 | 3 | 1 | | 0.5 | | | |
| 3 | Balance | 20 | 0.8 | 0.3 | 0.8 | | | | | |
| 4 | Balance | 30 | 0.5 | 0.1 | 5 | | | | | |
| 5 | Balance | 12 | 1.5 | 2.5 | 1 | | 0.2 | 0.2 | | 0.3 |
| 6 | Balance | 3 | 12 | 3 | 1 | | 0.5 | | | |
| 7 | Balance | 12 | 1 | 2.5 | 1 | | | 0.2 | | 0.3 |
| 8 | Balance | 12 | 1.5 | 2.5 | 1 | | 0.2 | 0.2 | 0.3 | |
| 9 | Balance | 35 | 1 | 1.5 | 0.2 | 0.7 | 1 | 0.5 | 0.5 | 0.3 |
| 10 | Balance | 40 | 0.5 | 0.1 | 0.8 | | | 0.2 | | |
| 11 | Balance | 20 | 1 | | 1 | | | 0.2 | | 0.3 |
| 12 | Balance | 12 | 1.5 | 2.5 | 1 | | 0.2 | 0.2 | | 0.3 |
| 13 | Balance | 12 | 1.5 | 2.5 | 1 | | 0.2 | 0.2 | | 0.3 |
| 14 | Balance | 12 | 1 | 2.5 | 1 | | | 0.2 | | 0.3 |
| 15 | Balance | 20 | 1 | | 1 | | | 0.2 | | 0.3 |
| Comparative Examples | | | | | | | | | | |
| 16 | Balance | 12 | 1 | 2.5 | 1 | | | 0.2 | | 0.3 |
| 17 | Balance | 12 | 1 | 2.5 | 1 | | | 0.2 | | 0.3 |
| 18 | Balance | 12 | 1 | 2.5 | 1 | | | 0.2 | | 0.3 |
| 19 | | 10 | Balance | | | | | | | |
| 20 | Balance | 12 | 1 | 2.5 | 1 | 0.2 | 0.2 | | | 0.3 |
| 21 | Balance | 12 | 1 | 2.5 | 1 | 0.2 | 0.2 | | | 0.3 |
| 22 | Balance | 12 | 1 | 2.5 | 1 | 0.2 | 0.2 | | | 0.3 |
| 23 | Balance | 20 | 1 | | 1 | | | 0.2 | | 0.3 |
| 24 | Balance | 20 | 1 | | 1 | | | 0.2 | | 0.3 |
| 25 | Balance | 20 | 1 | | 1 | | | 0.2 | | 0.3 |

TABLE 3

| Sample No. | Thickness of Intermediate Layer ($T_1$) | Thickness of Surface Layer ($T_2$) | $T_1 + T_2$ | $T_2/(T_1 + T_2)$ | Dam Layer |
|---|---|---|---|---|---|
| Examples of the Invention | | | | | |
| 1 | 0.20 | 0.10 | 0.30 | 0.33 | Al |
| 2 | 0.20 | 0.10 | 0.30 | 0.33 | Ni |
| 3 | 0.22 | 0.08 | 0.30 | 0.27 | Al |
| 4 | 0.20 | 0.10 | 0.30 | 0.33 | Al |
| 5 | 0.24 | 0.06 | 0.30 | 0.20 | — |
| 6 | 0.20 | 0.10 | 0.30 | 0.33 | Al |
| 7 | 0.22 | 0.08 | 0.30 | 0.27 | — |
| 8 | 0.24 | 0.06 | 0.30 | 0.20 | Al |
| 9 | 0.15 | 0.15 | 0.30 | 0.50 | Al |
| 10 | 0.22 | 0.08 | 0.30 | 0.27 | Ni |
| 11 | 0.25 | 0.20 | 0.45 | 0.44 | Al |
| 12 | 0.24 | 0.24 | 0.48 | 0.50 | — |
| 13 | 0.24 | 0.21 | 0.45 | 0.47 | Al |
| 14 | 0.30 | 0.15 | 0.45 | 0.33 | Al |
| 15 | 0.24 | 0.21 | 0.45 | 0.47 | — |
| Comparative Examples | | | | | |
| 16 | — | 0.30 | 0.30 | 1 | Al |
| 17 | 0.25 | 0.05 | 0.30 | 0.17 | — |
| 18 | 0.13 | 0.17 | 0.30 | 0.56 | Al |
| 19 | 0.24 | 0.06 | 0.30 | 0.2 | Ni |
| 20 | 0.20 | 0.05 | 0.25 | 0.2 | — |
| 24 | 0.25 | 0.05 | 0.30 | 0.17 | Ni |
| 22 | 0.20 | 0.25 | 0.45 | 0.55 | Al |
| 23 | 0.25 | 0.05 | 0.30 | 0.17 | Ni |
| 24 | 0.20 | 0.25 | 0.45 | 0.55 | — |
| 25 | 0.13 | 0.17 | 0.30 | 0.56 | Al |

*Unit of Thickness: mm

Then, an edge loaded fatigue test was conducted under test conditions shown in Table 4. In this misalignment fatigue test, a shaft liable to be flexed was used so that misalignment could occur at opposite end portions of the composite bearing. Therefore, in the test by use of a misalignment testing machine, there were obtained results including the influence by the conformability of the composite bearing, and therefore the fatigue strength corresponding to actual use can be evaluated. In the test, a load was increased 10 MPa by 10 MPa, and three test samples (composite bearings) of each of Examples and Comparative Examples were tested at loads near to its maximum load value.

TABLE 4

| | Test Conditions |
|---|---|
| Testing machine | Misalignment fatigue test machine |
| Rotational speed | 3,250 rpm |
| Peripheral speed | 9.0 m/s |
| Testing time | 20 hours |
| Oil temperature | 120° C. |
| Pressure of oil supply | 0.3 MPa |
| Lubricating oil | SAE 20 |
| Shaft | Hardened S45C; Hv: Not less than 600 |

Evaluation was made by observing the surface of the surface layer with the eyes after the fatigue test, and results of the test is shown in Table 5 in which those samples having no fatigue crack are indicated by ○ while those samples having fatigue crack are indicated by x.

TABLE 5

| | Load (MPa) | | | | | | |
|---|---|---|---|---|---|---|---|
| Sample No. | 80 | 90 | 100 | 110 | 120 | 130 | 140 |
| Examples of the Invention | | | | | | | |
| 1 | ○ | ○ | ○ | ○○○ | x○○ | | |
| 2 | ○ | ○ | ○ | ○ | ○○○ | x○○ | |
| 3 | ○ | ○ | ○ | ○ | ○○○ | xxx | |
| 4 | ○ | ○ | ○ | ○○○ | x○○ | | |
| 5 | ○ | ○ | ○ | ○ | ○ | ○○○ | xxx |
| 6 | ○ | ○ | ○ | ○○○ | x○○ | | |
| 7 | ○ | ○ | ○ | ○ | ○ | ○○○ | xxx |
| 8 | ○ | ○ | ○ | ○ | ○ | ○○○ | ○○○ |
| 9 | ○ | ○ | ○ | ○ | ○○○ | xxx | |
| 10 | ○ | ○ | ○ | ○○○ | x○○ | | |
| 11 | ○ | ○ | ○ | ○○○ | x○○ | | |
| 12 | ○ | ○ | ○ | ○ | ○○○ | xxx | |
| 13 | ○ | ○ | ○ | ○ | ○ | ○○○ | xxx |
| 14 | ○ | ○ | ○ | ○ | ○○○ | x○○ | |
| 15 | ○ | ○ | ○ | ○ | ○○○ | xxx | |
| Comparative Examples | | | | | | | |
| 16 | ○ | ○○○ | xxx | xxx | | | |
| 17 | ○ | ○ | ○○○ | xxx | | | |
| 18 | ○ | ○ | ○○○ | x○○ | | | |
| 19 | ○ | ○ | ○ | ○ | ○○○ | xx○ | |
| 20 | ○ | ○ | ○○○ | x○x | | | |
| 21 | ○ | ○ | ○○○ | ○xx | | | |
| 22 | ○ | ○ | ○○○ | xxx | | | |
| 23 | ○ | ○ | ○○○ | xxx | | | |
| 24 | ○ | ○○○ | x○○ | | | | |
| 25 | ○ | ○ | ○○○ | xxx | | | |

All of the Comparative Examples except Comparative Example 19 exhibited the maximum load without crack on the order of 90–100 MPa whereas all of the Examples of the invention exhibited the maximum load without crack on the order of not less than 110 MPa, and thus it has been confirmed that the samples of the present invention exhibit a high fatigue strength under a misalignment condition. The sample of Comparative Example 19 had the surface layer consisting of Pb—Sn alloy which had heretofore been used to form a composite bearing excellent in conformability, and this sample exhibited a high value of 120 MPa regarding maximum load without crack. However, the sample of Comparative Example 19 was more worn than the Examples of the invention and the other Comparative Examples, and was inferior in wear resistance. On the other hand, the samples of all of the Examples of the invention exhibited high maximum loads without crack close to that of the sample of Comparative Example 19, and were worn in a small amount.

The sample of Comparative Example 16 had the surface layer formed directly on the backing metal layer, and had no intermediate layer. This sample was substantially a two-layer Al—Sn bearing of the known type, and had a lower fatigue strength as compared with Examples 7 and 14 and Comparative Examples 17 and 18 each having the surface layer of the same composition as that of Comparative Example 16. From this, it has been confirmed that the use of the intermediate layer consisting of Cu—Pb alloy is advantageous.

Comparative Example 21 having the surface layer thickness ($T_2$) of 0.05 mm exhibited the maximum load without crack on the order of 100 MPa whereas Example 5 having the surface layer thickness of 0.06 mm exhibits the maximum load without crack on the order of 130 MPa. Thus, it has been found that the thickness of the surface layer exerts a great influence on the fatigue strength. A comparison between Example 7 and Comparative Example 17 and the reviewing of Comparative Example 23 indicate that when the thickness of the surface layer is not less than 0.06 mm, the high maximum load without crack is obtained, and that when this thickness is less than 0.06 mm, the fatigue strength is low, and the maximum load without crack is as low as less than 100 MPa.

No large difference in maximum load without crack was seen between Examples 5 and 12 in which their respective intermediate layers and surface layers had the same composition and in which the sum ($T_1+T_2$) of the thicknesses of the intermediate layer and the surface layer in Examples 5 and 12 were 0.3 mm and 0.48 mm, respectively. No large difference in maximum load without crack was seen either between Examples 8 and 13 in which their respective intermediate layers and surface layers had the same compositions and in which the sum ($T_1+T_2$) of the thicknesses of the intermediate layer and the surface layer in Examples 8 and 13 were 0.3 mm and 0.45 mm, respectively.

In each of those Examples in which the value of $(T_2)/(T_1+T_2)$ was not less than 0.2 but not more than 0.5, the maximum load without crack thereof exceeds 110 MPa. In making a comparison between Example 7 and Comparative Example 18 in which their respective intermediate layers and surface layers had the same composition, the value of $(T_2)/(T_1+T_2)$ in Example 7 and in Comparison Example 18 were 0.27 and 0.56, respectively, and, the maximum load without crack in Example 7 and in Comparison Example 18 were 130 MPa and 100 MPa, respectively. Thus, a large difference in maximum load without crack was seen between Example 7 and Comparative Example 18, and therefore it has been confirmed that the value of $(T_2)/(T_1+T_2)$ exerts a great influence on the fatigue strength. A comparison between Example 12 and Comparative Example 22, as well as a comparison of Example 11 with Comparative Examples 24 and 25, indicates that when the value of $(T_2)/(T_1+T_2)$ is not more than 0.5, the high maximum load without crack is obtained. This shows that when the thickness ($T_2$) of the surface layer is so large that the value of $(T_2)/(T_1+T_2)$ is more than 0.5, the fatigue strength is lowered.

With respect to the influence of the dam layer on the fatigue strength, no significant difference was seen from the Examples and the Comparative Examples.

What is claimed is:

1. A composite copper alloy bearing consisting of a backing metal layer, an intermediate layer of Cu—Pb alloy, and a single surface layer of Al—Sn alloy, said single surface layer having a thickness which is
   (1) not less than the larger of (i) 0.06 mm and (ii) 0.2 times the sum of thicknesses of said intermediate layer and said surface layers and also is
   (2) not more than a value 0.5 times the sum of the thicknesses of said intermediate layer and said surface layer.

2. A composite copper alloy bearing according to claim 1, in which said intermediate layer and said surface layer are bonded together by a pressure bonding method.

3. A composite copper alloy bearing according to claim 2, in which said intermediate layer consists essentially of 9 to 32 wt. % Pb, at least one kind selected from the group consisting of not more than 12 wt. % Sn and not more than 0.5 wt. % P, and the balance Cu and incidental impurities.

4. A composite copper alloy bearing according to claim 2, in which said surface layer consists essentially of 3 to 40 wt. % Sn, 0.5 to 15 wt. % Pb, 0.1 to 3 wt. % Si, 0.2 to 5 wt. % Cu, optionally at least one element not more than 3 wt. % in total selected from the group consisting of Ni, Mn, V, Mg and Sb, and the balance Al and incidental impurities.

5. A composite copper alloy bearing according to claim 2 wherein said intermediate layer and said surface layer are diffusion annealed together.

6. A composite copper alloy bearing according to claim 1, in which said intermediate layer consists essentially of 9 to 32 wt. % Pb, at least one kind selected from the group consisting of not more than 12 wt. % Sn and not more than 0.5 wt. % P, and the balance Cu and incidental impurities.

7. A composite copper alloy bearing according to claim 3, in which said surface layer consists essentially of 3 to 40 wt. % Sn, 0.5 to 15 wt. % Pb, 0.1 to 3 wt. % Si, 0.2 to 5 wt. % Cu, at least one optional element not more than 3 wt. % in total selected from the group consisting of Ni, Mn, V, Mg and Sb, and the balance Al and incidental impurities.

8. A composite copper alloy bearing according to claim 3, wherein said intermediate layer contains at least 0.01% P.

9. A composite copper alloy bearing according to claim 1, in which said surface layer consists essentially of 3 to 40 wt. % Sn, 0.5 to 15 wt. % Pb, 0.1 to 3 wt. % Si, 0.2 to 5 wt. % Cu, optionally at least one element not more than 3 wt. % in total selected from the group consisting of Ni, Mn, V, Mg and Sb, and the balance Al and incidental impurities.

10. A composite copper alloy bearing consisting of a backing metal layer, an intermediate layer of Cu—Pb alloy, a dam layer consisting of Ni or Al above said intermediate layer, and a single surface layer above said dam layer, said single surface layer being of Al—Sn alloy, and having a thickness which is
    (1) not less than a larger of (i) 0.06 mm and (ii) 0.2 times the sum of thicknesses of said intermediate layer and said single surface layer, and also is (2) not more than a value 0.5 times the sum of the thicknesses of said intermediate layer and said single surface layer.

11. A composite copper alloy bearing according to claim 5, in which said intermediate layer consists essentially of 9 to 32 wt. % Pb, at least one kind selected from the group consisting of not more than 12 wt. % Sn and not more than 0.5 wt. % P, and the balance Cu and incidental impurities.

12. A composite copper alloy bearing according to claim 11, in which said intermediate layer and said surface layer, with said dam layer therebetween, are bonded together by a pressure bonding method.

13. A composite copper alloy bearing according claim 10, in which said surface layer consists essentially of 3 to 40 wt % Sn, 0.5 to 15 wt. % Pb, 0.1 to 3 wt. % Si., 0.2 to 5 wt. % Cu, at least one optional element not more than 3 wt. % in total selected from the group consisting of Ni, Mn, V, Mg and Sb, and the balance Al and incidental impurities.

14. A composite copper alloy bearing according to claim 13, in which said intermediate layer and said surface layer, with said dam layer therebetween, are bonded together by a pressure bonding method.

15. A composite copper alloy bearing according to claim 10, in which said intermediate layer and said surface layer, with said dam layer therebetween, are bonded together by a pressure bonding method.

* * * * *